United States Patent
Hiehata et al.

(10) Patent No.: US 8,542,594 B2
(45) Date of Patent: Sep. 24, 2013

(54) TRAFFIC CONTROL METHOD AND APPARATUS FOR WIRELESS COMMUNICATION

(75) Inventors: Yasuhiko Hiehata, Saitama (JP); Hideyuki Koto, Saitama (JP); Hajime Nakamura, Saitama (JP)

(73) Assignee: KDDI Corporation, Tokyo (JP)

( * ) Notice: Subject to any disclaimer, the term of this patent is extended or adjusted under 35 U.S.C. 154(b) by 137 days.

(21) Appl. No.: 13/170,880

(22) Filed: Jun. 28, 2011

(65) Prior Publication Data

US 2011/0317556 A1 Dec. 29, 2011

(30) Foreign Application Priority Data

Jun. 28, 2010 (JP) ................................ 2010-146382
Sep. 9, 2010 (JP) ................................ 2010-201909

(51) Int. Cl.
*H04L 12/26* (2006.01)

(52) U.S. Cl.
USPC ......................................... 370/235; 370/220

(58) Field of Classification Search
USPC ..................... 370/229, 231, 235, 237, 395.41
See application file for complete search history.

(56) References Cited

U.S. PATENT DOCUMENTS

| 7,944,838 B2 | 5/2011 | Nakamura et al. |
| 2007/0041323 A1 | 2/2007 | Kitahara et al. |
| 2007/0165529 A1 | 7/2007 | Nakamura et al. |
| 2008/0298248 A1* | 12/2008 | Roeck et al. ................. 370/237 |
| 2012/0263036 A1* | 10/2012 | Barclay et al. ............... 370/230 |

FOREIGN PATENT DOCUMENTS

| JP | 2000-115839 A | 4/2000 |
| JP | 2004-200968 A | 7/2004 |
| JP | 2007-53465 A | 3/2007 |
| JP | 2007189592 A | 7/2007 |
| JP | 2008-005096 A | 1/2008 |
| JP | 2009-088955 A | 4/2009 |

OTHER PUBLICATIONS

Japanese Office Action dated Jul. 10, 2013, corresponds to Japanese Patent Applications No. 2010-146382 and 2010-201909, w/English translation.

* cited by examiner

*Primary Examiner* — Brenda H Pham
(74) *Attorney, Agent, or Firm* — Westerman, Hattori, Daniels & Adrian, LLP

(57) ABSTRACT

A throughput detector 101 detects a throughput R0. A threshold value Rref of the throughput R0 at which a network side can be presumed to be congested is stored in a threshold value storage unit 102. A comparator 103 compares the current throughput R0 with the threshold value Rref. A release request unit 104 requests release of a wireless resource when the throughput R0 falls below the threshold value Rref. In response to the release request, a controller 100 suitably disconnects a physical layer or a logical layer of a wireless section to release the wireless resource. A release term determining unit 105 determines a release term of the wireless resource. A resource request unit 106 makes the released wireless resource be acquired anew after the elapse of the release term to reconnect the wireless communication.

14 Claims, 8 Drawing Sheets

TRAFFIC CONTROL METHOD AND APPARATUS FOR WIRELESS COMMUNICATION

The present application is claims priority of Japanese Patent Application Serial No. 2010-146382, filed Jun. 28, 2010 and No. 2010-201909, filed Sep. 9, 2010, the content of which are hereby incorporated by reference in its entirety.

1. Field of the Invention

The present invention relates to a traffic control method and apparatus favorable for wireless communication in which bandwidth is controlled by a token bucket algorithm.

2. Description of the Related Art

As a method for controlling bandwidth in accordance with a congestion level of a network, Patent Document 1 discloses an art of limiting input and output of a transfer buffer using a token bucket algorithm. The token bucket algorithm is mainly arranged from a token rate and a token buffer. A token is a communication right for a data amount transferred by a communication apparatus. The token rate is a minimum throughput allowed for the communication apparatus. The token buffer is replenished at the token rate with the passage of time. If a communication right (token) is present in the token buffer, the communication apparatus can transmit data immediately in burst form in accordance with the amount of the communication right. When the token buffer becomes empty, communication is allowed only at the minimum bandwidth in accordance with the token rate.

By the token bucket algorithm, unfair occupation of a communication resource by repeating of burst downloading by a portion of users can be restricted and meanwhile, for many users who perform downloading between web browsing sessions, token buffers can be filled adequately during web browsing and burst downloading can be performed during downloading to realize stress-free use.

With a conventional token bucket algorithm, the network side congestion level is estimated based on an execution throughput of communication and thus when the token buffer becomes empty and the throughput is restricted by the token rate, the execution throughput of communication cannot be measured accurately. There is thus a technical issue that even when the network side congestion is resolved thereafter, this is not reflected immediately in the throughput of the communication apparatus.

To resolve the above technical issue, Patent Document 1 discloses an art with which, while an adequate amount of tokens are not stored in the token buffer, review of the token rate is disabled or tokens are forcibly inserted into the token buffer to make burst communication be performed and the execution throughput is measured in the meantime and reflected in the token rate to accurately link the token rate with the congestion of the network.

Patent Document 2 discloses an art enabling control of traffic, generated from a communication node and processed in a communication network, at the communication network side and enabling control of QoS assurance for each application that generates traffic.

Patent Document 3 discloses a wireless LAN system whereby the number of wireless nodes that can be connected to an access point apparatus is increased by making a wireless node, which is lowered in communication quality or has stopped communicating while being connected to a wireless LAN due to degradation of wireless environment or congestion of a wireless section, etc., transition temporarily to a dormant state of releasing a wireless link while retaining an upper communication layer and thereafter recover from the dormant state when send data are generated.

PRIOR ART DOCUMENT(S)

[Patent Document(s)]

Patent Document 1: Japanese Published Unexamined Patent Publication No. 2007-189592

Patent Document 2: Japanese Published Unexamined Patent Publication No. 2007-53465

Patent Document 3: Japanese Published Unexamined Patent Publication No. 2009-88955

With the art of Patent Document 1, when congestion of the network side is detected, the token rate decreases and the throughput of the communication apparatus is also suppressed to a low level accordingly. However, even if the throughput is suppressed to a low level, the communication resource remains allocated to the communication node and thus for example in a case where a wireless node performs communication relayed by a wireless base station, a session between the wireless node and the wireless base station is maintained even if the throughput is suppressed to a low level by the token bucket algorithm. A valuable wireless resource, such as a session bandwidth of the wireless section or a connection capacity of the wireless base station, is thus wastefully occupied by the session of low throughput.

With the art of Patent Document 2, although the QoS of each application that generates traffic is assured, when the network is congested, a communication holding time of each application becomes long and time occupied by a logical link formed via the network becomes long. This causes loss of communication opportunities for other applications and users, especially with circuit switching type communication.

With the art of Patent Document 3, a wireless node that has transitioned into the dormant state due to lowering of communication quality by degradation of the wireless environment or congestion of the wireless section is recovered from the dormant state with the generation of send data at the wireless node. However, the wireless quality may not necessarily be improved at the timing of generation of the send data. Communication must thus be performed under the wireless environment that is still degraded or in the wireless section that is still congested after reconnection and the wireless resource is wastefully occupied by wireless communication of low quality.

SUMMARY OF THE INVENTION

An object of the present invention is to provide a traffic control method and apparatus with which a valuable wireless resource is not wastefully occupied by a session in which a throughput is suppressed to a low level by a token bucket algorithm.

To achieve the above object, the present invention provides the following means in a traffic control apparatus for wireless communication that adopts traffic control by a token bucket algorithm and controls a throughput according to a token rate for wireless communication relayed by a wireless base station.

(1) a congestion detector for detecting a network congestion, a release request unit for requesting release of at least a portion of an occupied wireless resource when the network congestion is detected, a release term determining unit for determining a release term of the wireless resource, a resource request unit for requesting acquisition of the wireless resource after elapse of the release term from the release of the wireless resource, and a controller for suspending connection by releasing the wireless resource in response to the release request and reconnecting by acquiring the wireless resource in response to the acquisition request are included.

(2) When the network congestion is detected, a session bandwidth occupied in a wireless section is released by disconnecting a physical link while maintaining a logical link.

(3) When the network congestion is detected, a connection capacity occupied in the wireless base station is released by disconnecting the logical link together with the physical link.

(4) When the network congestion is detected, a portion of the session bandwidth occupied in the wireless section is released by suppressing the throughput to a restricted rate lower than the throughput corresponding to the token rate.

The following effects are achieved by the present invention.

(1) In traffic control for wireless communication adopting the token bucket algorithm, a session that cannot obtain a high throughput due to network congestion can be prevented from wastefully occupying a valuable wireless resource because when the token rate decreases due to congestion of the wireless section or the network and the throughput of wireless communication decreases accordingly, the occupied wireless resource is released temporarily and the wireless resource is thereafter acquired anew to restart the wireless communication. Also, after the end of the release term, the token buffer is revived, burst communication is enabled, and accurate review of the token rate is thus enabled.

(2) The session bandwidth occupied in the wireless section can be released because the wireless resource is released by disconnecting the physical link while maintaining the logical link. Also, the wireless communication can be restarted promptly because the logical link is maintained.

(3) Release of the connection capacity occupied in the wireless base station is enabled in addition to release of the session bandwidth occupied in the wireless section because the wireless resources are released by disconnecting not only the physical link but the logical link as well.

(4) A portion of the session bandwidth occupied in the wireless section can be released while maintaining the wireless communication because the wireless resource is released by suppressing the throughput to the restricted rate that is lower than the token rate while maintaining the logical link.

DETAILED DESCRIPTION OF THE PREFERRED EMBODIMENTS

Figure 1:
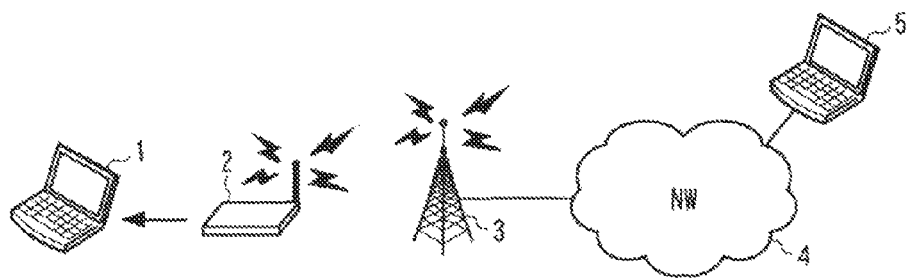
FIG. 1 is a block diagram of a wireless network to which a traffic control system according to the present invention is applied.

FIG. 1 is a block diagram of a wireless network to which a traffic control system according to the present invention is applied, and the network includes a wireless node 1, which may be a personal computer, PDA, or smartphone, etc., a wireless communication modem 2 installed or incorporated in the wireless node 1, and a wireless base station 3 that establishes a wireless link with the modem 2. The wireless node 1 communicates with an opposite peer 5 via the modem 2, the base station 3, and a wide-area network 4, such as the Internet, etc. The modem 2 adopts a token bucket algorithm for traffic control and controls communication traffic based on a token rate Rt that is set dynamically according to congestion of a wireless section or the network 4.

Figure 2:
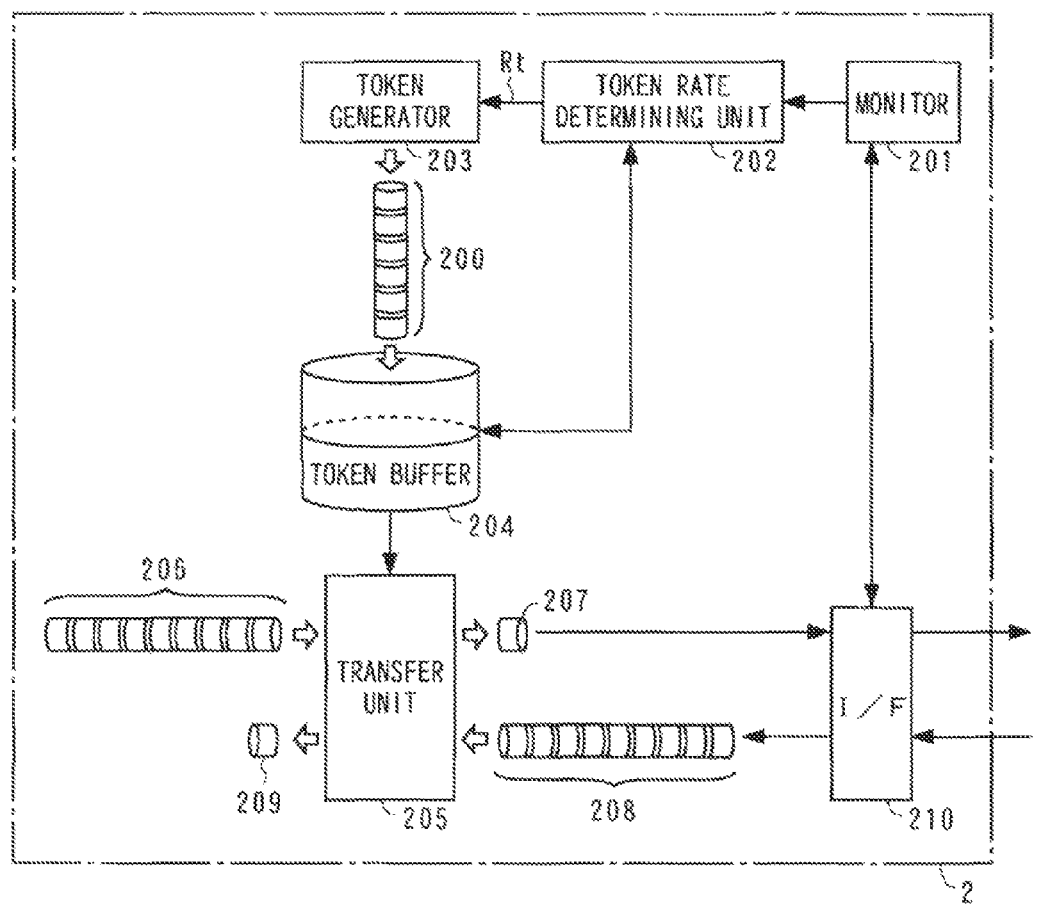
FIG. 2 is a diagram of an arrangement related to a token bucket of a wireless communication modem.

FIG. 2 is a diagram of a general arrangement related to a token bucket of the modem 2. A monitor 201 detects the congestion of the wireless section or the network 4 based, for example, on an effective throughput at an interface 210. Based on the monitoring result, a token rate determining unit 202 determines the token rate Rt at a timing of start of communication and thereafter reviews the token rate Rt based on the effective throughput at a predetermined monitoring cycle.

A token generator 203 generates tokens 200 at the token rate Rt and outputs the tokens to a token buffer 204. Each time one token 200 stored in the token buffer 204 is consumed, a transfer unit 205 reads and transfers predetermined amounts of send and receive data 207 and 209 from a send buffer 206 or a receive buffer 208.

The monitor 201 monitors the congestion based on the throughput of the send and receive data 207 and 209 and thus cannot accurately monitor the congestion under circumstances where the throughput is directly affected by the token rate Rt as in a case where no tokens 200 are stored in the token buffer 204. The token rate determining unit 202 thus executes the determination and review of the token rate only at timings at which an adequate amount of the tokens 200 are stored in the token buffer 204 and burst communication is enabled.

Figure 3:
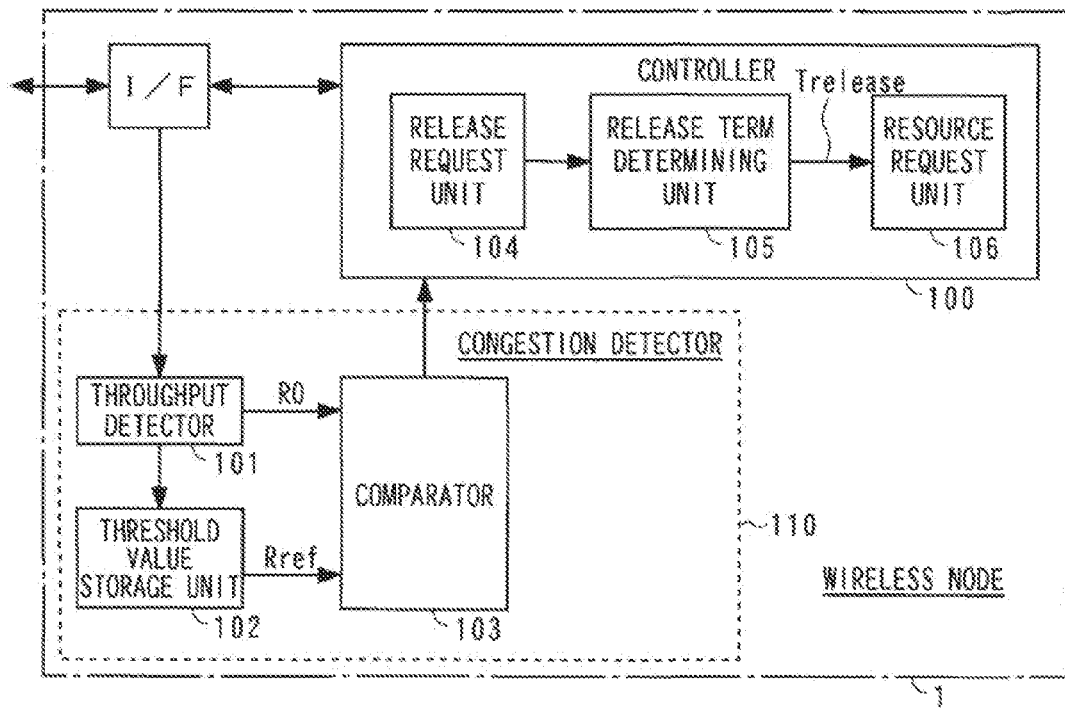
FIG. 3 is a block diagram of an arrangement related to traffic control of a wireless node.

FIG. 3 is a block diagram of an arrangement related to traffic control of the wireless node 1. A congestion detector 110 detects network congestion when an indicator of network congestion exceeds the threshold value. A controller 100 controls the communication between the wireless node 1 and the opposite peer 5.

In the congestion detector 110, a throughput detector 101 detects a throughput R0 of packets sent to and received from the modem 2 are detected. A threshold value Rref of the throughput R0 at which the network side can be presumed to be congested is stored in advance in a threshold value storage unit 102. A comparator 103 compares the current throughput R0 with the threshold value Rref.

In the controller 100, a release request unit 104 requests release of wireless resources when the throughput R0 falls below the threshold value Rref. A physical layer and a logical layer of the wireless section are thereby disconnected and the wireless resources are released. A release term determining unit 105 determines a release term Trelease of the wireless resources. A resource request unit 106 requests reconnection by resource acquisition after the elapse of the release term Trelease.

Figure 4:
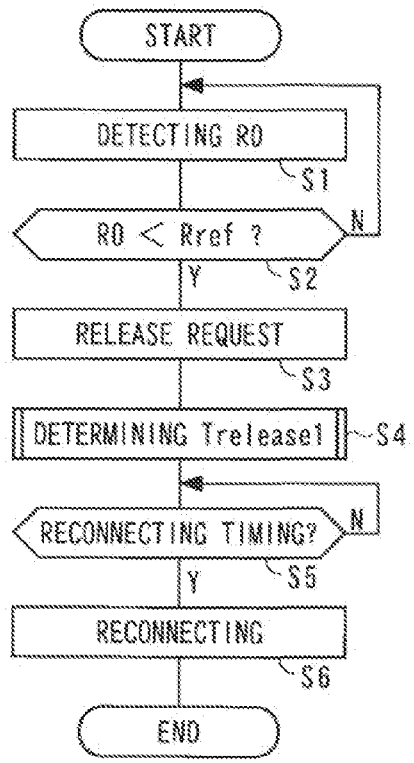
FIG. 4 is a flowchart of operation of a first embodiment.
Figure 5:
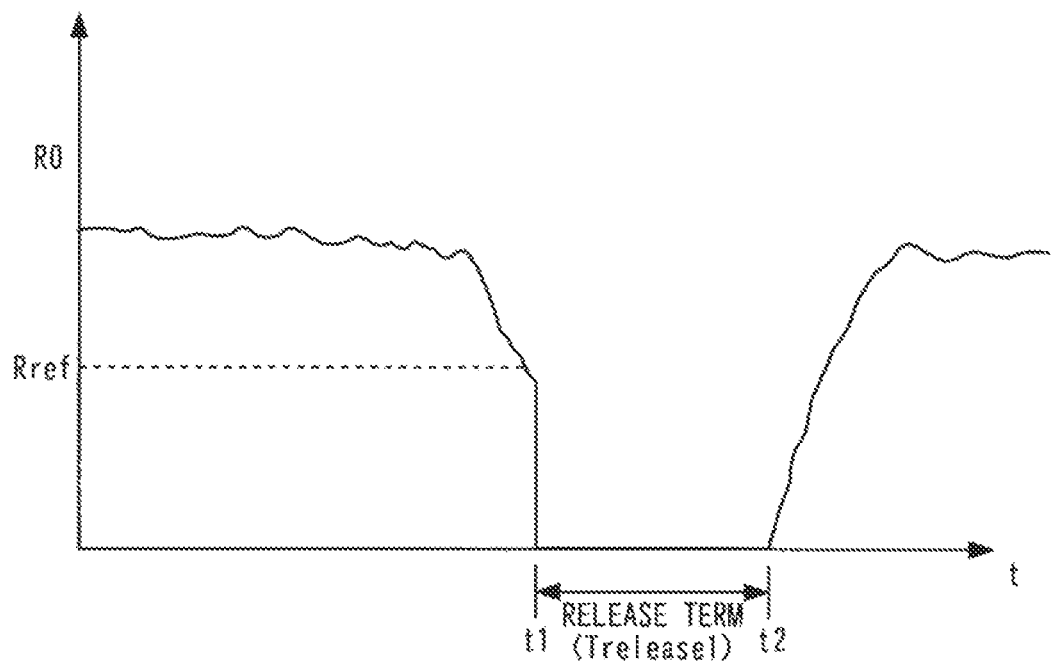
FIG. 5 is a time chart of the first embodiment.

An operation of the embodiment of the present invention shall now be described in detail with reference to the block diagram together with flowcharts and a time chart. FIG. 4 is a flowchart of operation of the first embodiment and mainly shows a traffic control operation at the wireless node 1. FIG. 5 is a time chart thereof.

In step S1, the throughput R0 of the wireless node 1 is detected by the throughput detector 101. The throughput R0 increases and decreases depending on the token rate Rt at the communication modem 2 and thus serves as an index that represents the congestion of the wireless section or the network 4. In step S2, the throughput R0 and the threshold value Rref are compared at the comparator 103. If the throughput R0 falls below the threshold value Rref, as before time t1 in FIG. 5, it is judged that the token rate Rt at the modem 2 is high and a serious congestion is not occurring at the network side and the above process is repeated upon returning to step S1.

On the other hand, if the network side is congested and the token rate Rt of the modem 2 decreases so that the throughput R0 falls below the threshold value Rref at time t1 in FIG. 5, this is detected in step S2. In step S3, the release request unit 104 requests the release of the wireless resources in response to the comparison result.

In response to the release request, the controller 100 suspends communication completely, disconnects the physical link to reduce a session bandwidth of the wireless section, and disconnects an upper layer logical link to reduce the number of sessions connected to the wireless base station 3. In the wireless section, the session bandwidth that has been deleted is allocated to other sessions. Vacancies in connection capacity increase at the wireless base station 3 and other wireless nodes can thus be accommodated anew. In step S4, the release term Trelease (Trelease1 here) of the wireless resources is determined by the release term determining unit 105.

Figure 6:
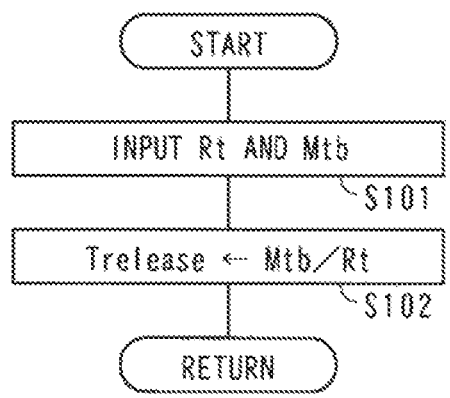
FIG. 6 is a flowchart of a method for determining Trelease1 in the first embodiment.

FIG. 6 is a flowchart of an example of a method for determining Trelease1. In step S101, the current token rate Rt and a token buffer size Mtb are read. In step S102, Trelease1 is computed by applying the Rt and Mtb in the following formula (1).

$$Trelease1 = Mtb/Rt \tag{1}$$

Returning to FIG. 4, in step S5, it is judged whether or not Trelease1 has elapsed. If at time t2 in FIG. 5, it is judged that Trelease1 has elapsed, the resource request unit 106 requests reconnection by resource acquisition in step s6. The controller 100 acquires the wireless resources in response to the resource acquisition request and reconnects the released wireless link and logical link.

By the present embodiment, when in wireless communication traffic control adopting the token bucket algorithm, the wireless section or the network becomes congested and the token rate decreases and the throughput of wireless communication decreases accordingly, the wireless resources are released temporarily and thereafter the wireless resources are acquired anew and the wireless communication is restarted. A session that cannot be provided with a high throughput due to congestion of the network can thus be prevented from wastefully occupying the valuable wireless resources. Further, after the end of Trelease1, burst communication is enabled and thus accurate review of the token rate is enabled.

If the wireless node 1 or the opposite peer 5 is provided with a resume function, the wireless communication can be restarted from the state at the time of interruption. If Trelease1 is notified to an upper layer of the wireless node 1, the upper layer can ascertain the term during which wireless communication is not performed and thus consumption power can be reduced by putting wireless communication functions in a sleep state, etc., just during this term.

Although with the above-described embodiment, a case where both the physical link and the logical link of the wireless communication are disconnected to release the wireless resources was described, if a dormant mode is adopted in the wireless node 1 or the modem 2, just the physical link can be disconnected while maintaining the logical link to enable release of just the session bandwidth of the wireless section.

At this point, a selection can be made from among the following three options A, B, and C in regard to disconnection and reconnection of the wireless link.

A: The wireless node 1 or the modem 2 disconnects the physical connection of the wireless layer and suspends packets outgoing from the wireless node 1 to the wireless section. In this process, the wireless node 1 or the modem 2 autonomously transitions into the dormant state to maintain logical connection among upper protocols (for example, PPP) of the wireless node 1 and the opposite peer 5.

B: In the case where the wireless node 1 or the modem 2 transitions into the dormant state, communication of upper layers is in a state of being logically connected but physically disconnected from the network and communication cannot be performed. The upper layer protocols are thus disconnected at a predetermined timeout time. To prevent this, in the option B, temporary recovery from the dormant state is performed immediately before each timeout time to establish physical connection of the wireless layer and reset the timeout.

C: In place of the temporary recovery from the dormant state in the option B, receive data are stored in advance in a receive buffer and the timeout is reset by simulating wireless communication using the data in the receive buffer immediately before each timeout time.

An operation of a second embodiment that adopts the above dormant mode shall now be described according to each of the options.

Figure 7:
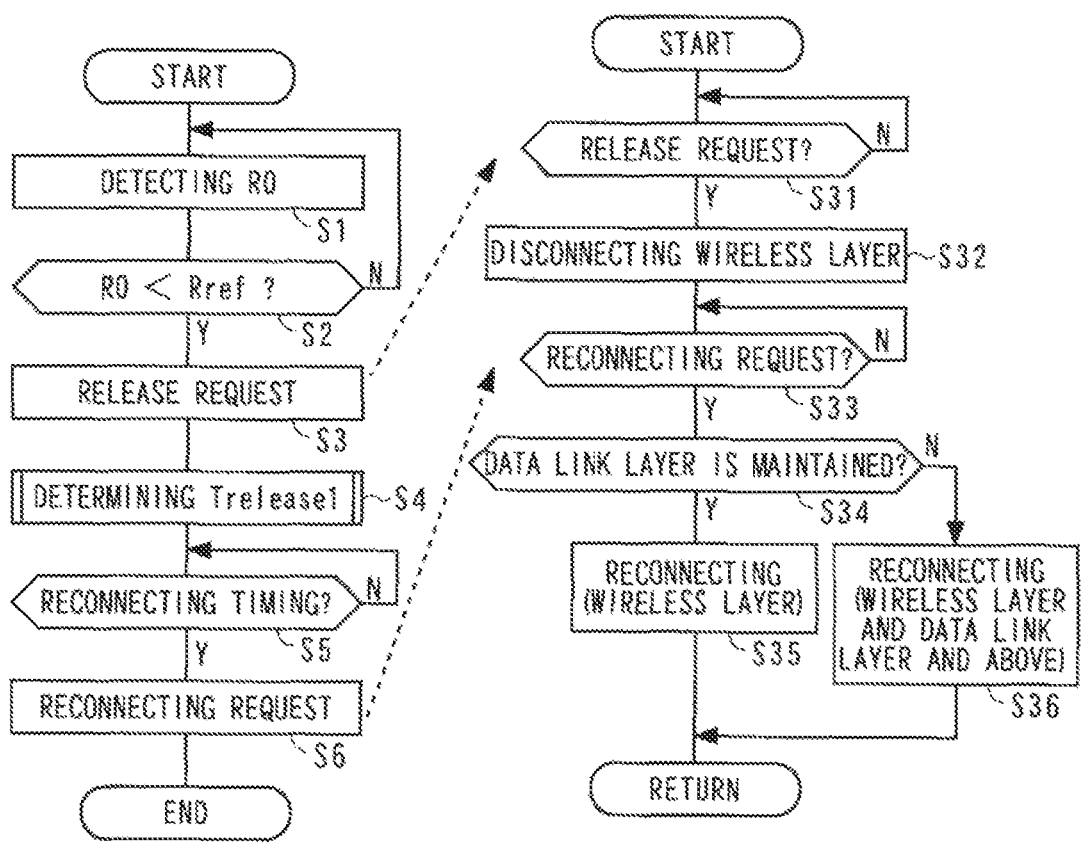
FIG. 7 is a flowchart of an option A of a second embodiment.

FIG. 7 is a flowchart of an operation unique to the option A, and symbols that are the same as the above express the same or equivalent portions.

When in step S3, the release request unit 104 requests the release of the wireless resource, the controller 100 detects the release request in step S31 and then step S32. In step S32, just the physical connection of the wireless layer is disconnected while maintaining the logical connection of the data link and above according to the dormant mode.

In step S4, Trelease1 is determined. In step S5, it is judged whether or not Trelease1 has elapsed since the release of the wireless resource. If it is judged that Trelease1 has elapsed, the resource request unit 106 requests reconnection by resource acquisition in step S6.

At the controller 100, step S34 is entered when the reconnection request is detected in step S33. In step S34, it is judged whether or not the data link layer is maintained. The data link layer is disconnected, for example, according to a TCP timeout, and if the TCP timeout has yet to arrive and the data link layer is maintained. In step S35, the physical connection of the disconnected wireless layer is reestablished and coupled to the upper layers that are maintained. On the other hand, if the data link layer is already disconnected, the physical connection of the disconnected wireless layer is reestablished and at the same time, the logical connection of the data link layer and above is also established in step S36

By the option A, transition into the dormant state is performed when the wireless communication is suspended and only the physical connection of the wireless layer is disconnected while the logical connection of the upper layers is maintained, and thus when Trelease1 elapses, the wireless communication can be restarted just by reestablishing the physical connection of the wireless layer.

Figure 8:
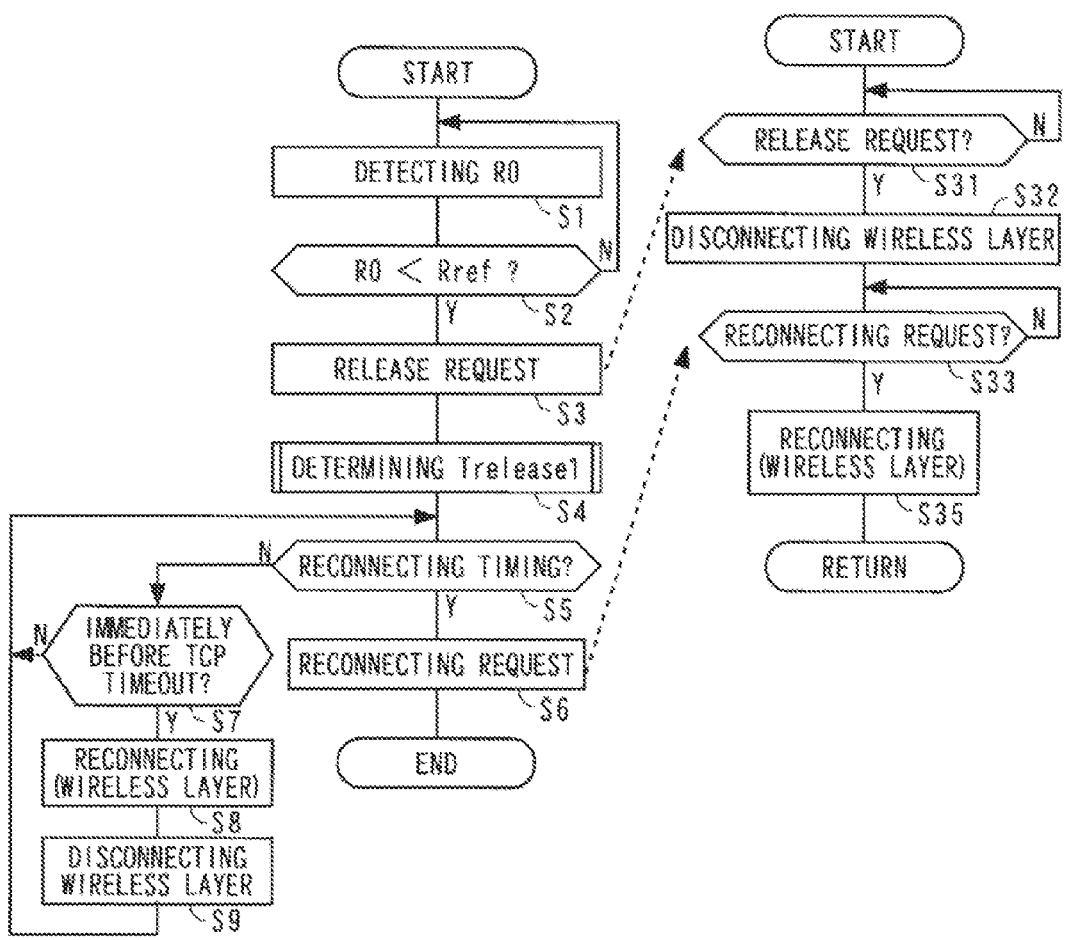
FIG. 8 is a flowchart of an option B of the second embodiment.

FIG. 8 is a flowchart of an operation unique to the option B, and symbols that are the same as the above express the same or equivalent portions.

If in step S5, it is judged that the timing for reconnection has not yet arrived, it is judged whether or not the present timing is immediately before the TCP timeout in step S7. If the present timing is not immediately before the TCP timeout, a return to step S5 is performed.

If it is judged that the present timing is immediately before the TCP timeout, the temporary recovery from the dormant state is performed, and the physical connection of the wireless layer that was disconnected is reestablished temporarily and coupled to the upper layers that are maintained in step S8. Wireless communication is consequently restarted and the timer for the TCP timeout is thus reset. In step S9, transition into the dormant state is performed again, and just the physical connection of the wireless layer is disconnected while maintaining the logical connection of the data link layer and above. The above process is repeated until it is judged in the step S5 that Trelease1 has elapsed.

By the option B, the temporary recovery from the dormant state is performed to temporarily restart the wireless communication and reset the timeout at a timing within Trelease1 and before timeout of the upper layers. Thus even in a case where Trelease1 is set to be longer than the timeout time of the upper layers, the wireless communication can be restarted just by reestablishing the physical connection of the wireless layer after the elapse of Trelease1.

Figure 9:
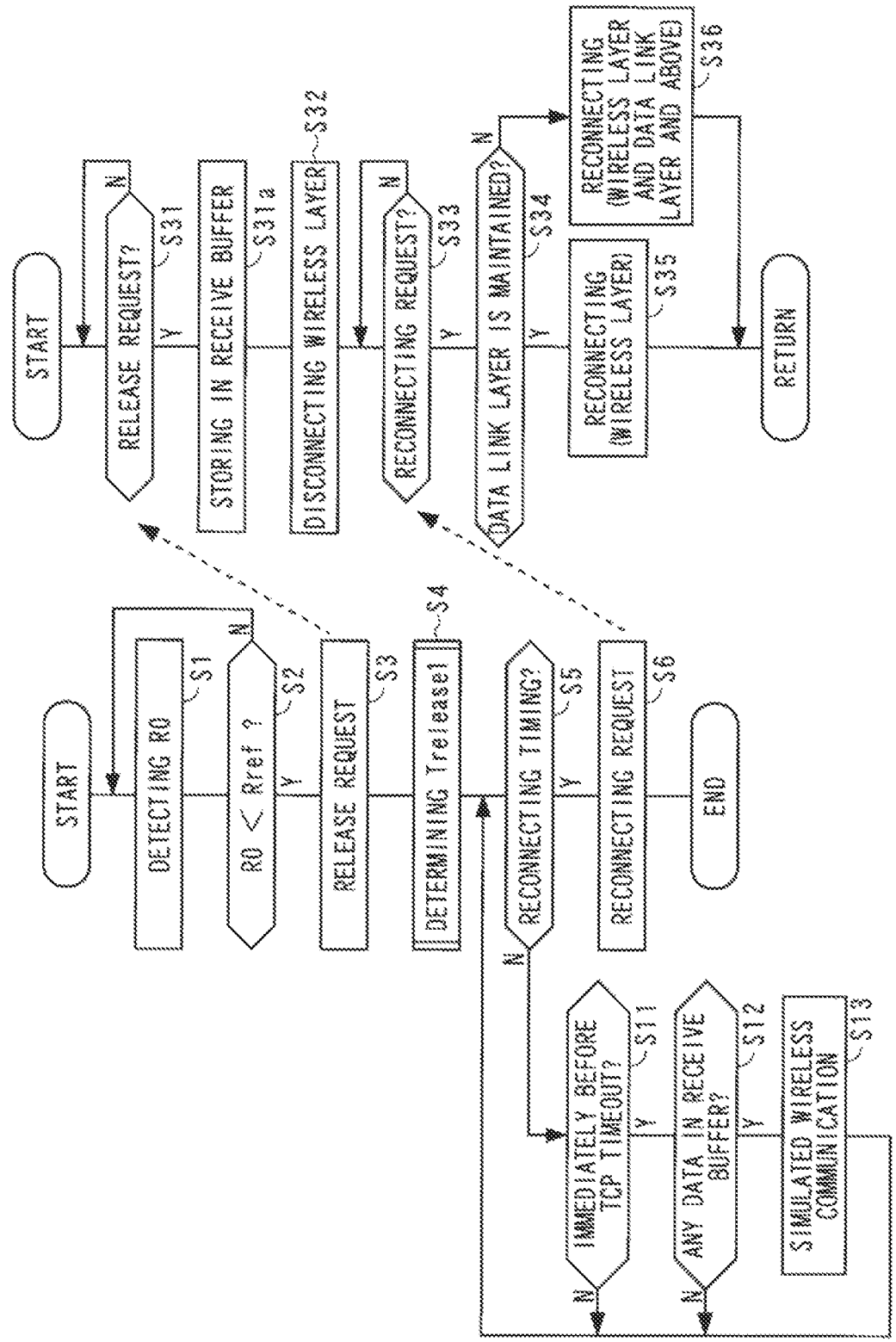
FIG. 9 is a flowchart of an option C of the second embodiment.

FIG. 9 is a flowchart of an operation unique to option C, and symbols that are the same as the above express the same or equivalent portions.

When in step S3, the release request unit 104 requests the release of the wireless resource, the controller 100 detects the release request in step S31. In step S31a, receive data of a predetermined amount are temporarily stored in the receive buffer. From step S32 onward, the same process as that of FIG. 7 is executed.

Meanwhile, if in step S5, it is judged that the timing for reconnection has yet to arrive, it is judged whether or not the present timing is immediately before the TCP timeout in step S11. If it is judged that the present timing is immediately before the TCP timeout, it is judged whether or not any receive data remain in the receive buffer in step S12. If there are remaining receive data, wireless communication is simulated in step S13. That is, the receive data temporarily stored in the receive buffer are transferred to an upper layer of the wireless node 1, and the data transferred to the wireless section from the upper layer are stored in a send buffer. Although the above process is continued until expiration of Trelease1 is detected in the step S5, if the data in the receive buffer become fully consumed beforehand, a return to step S5 is performed so that TCP timeout occurs and the connection of the data link layer is also suspended.

By the option C, the timeout is reset at a timing before the timeout of the upper layers occurs during Trelease1. Thus even in the case where Trelease1 is set to be longer than the timeout time of the upper layers, the wireless communication can be restarted just by reestablishing the physical connection of the wireless layer after the elapse of Trelease1.

Figure 10:
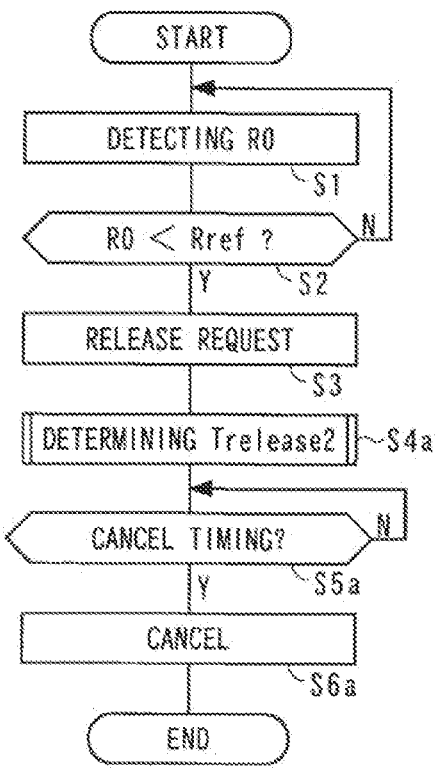
FIG. 10 is a flowchart of operation of a third embodiment.
Figure 11:
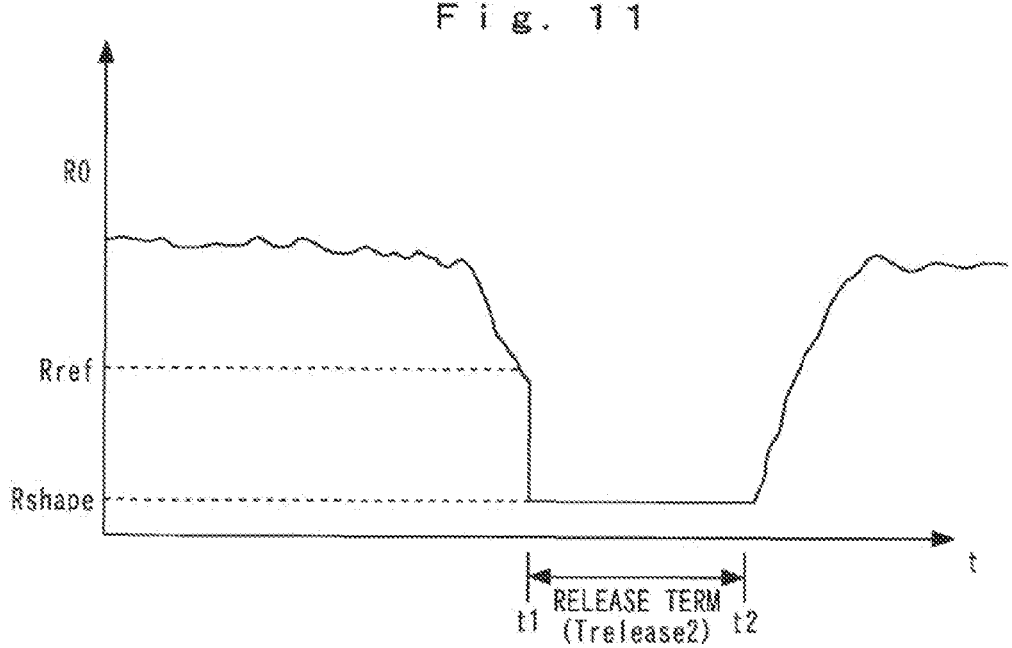
FIG. 11 is a time chart of the third embodiment.

FIG. 10 is a flowchart of operation of a third embodiment, and FIG. 11 is a time chart thereof.

In step S1, the throughput R0 of the wireless node 1 is detected. In step S2, the throughput R0 and the threshold value Rref are compared.

If at a time t1 in FIG. 8, R0 falls below Rref, this is detected in step S2. In step S3, the release request unit 104 requests the release of a wireless resource. In response to the request, the controller 100 suppresses the throughput R0 to a restricted rate (shape rate) Rshape that is lower than the current token rate Rt to reduce the session bandwidth in the wireless section. Consequently in the wireless section, a session bandwidth equivalent to the reduced session bandwidth is allocated to other sessions. In step S4a, the release term Trelease (Trelease2 here) of the wireless resource is determined by the release term determining unit 105.

Figure 12:
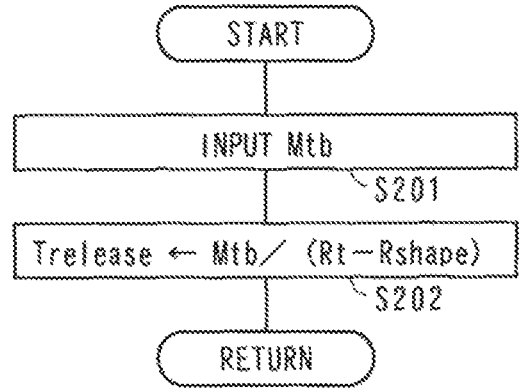
FIG. 12 is a flowchart of a method for determining Trelease2 in the third embodiment.

FIG. 12 is a flowchart of an example of a method for determining Trelease2 in the step S4a, and in step S201, the current token rate Rt and the token buffer size Mtb are read. In step S202, Trelease2 is computed by applying the Rt and Mtb in the following formula (2).

$$Trelease2 = Mtb/(Rt - Rshape) \qquad (2)$$

Returning to FIG. 10, in step S5a, it is judged whether or not Trelease2 has elapsed from the release of the wireless resource. If at time t2, it is judged that Trelease2 has elapsed, the resource request unit 106 requests reconnection by resource acquisition in step S6a. In response to the reconnection request, the controller 100 cancels the throughput restriction.

By the present embodiment, in releasing the wireless resource upon congestion at the network side, the throughput is suppressed to the restricted rate that is lower than the throughput corresponding to the token rate while maintaining the logical link, and thus a portion of the session bandwidth occupied in the wireless section can be released while maintaining the wireless communication. The released session bandwidth can thus be allocated to other sessions. Also, the restricted rate R-shape is set to be lower than the token rate Rt and the token buffer can thus be revived. Thus after the end of Trelease2, burst communication is enabled and accurate review of the token rate is enabled.

Although with the third embodiment, it was described that Trelease2 of the wireless resource is predicted in advance and thereafter the throughput restriction is cancelled upon waiting for the elapsed time to reach Trelease2, the throughput restriction may instead be cancelled upon detection of a timing at which the token buffer has revived completely in view of the point that when switching to communication at the restricted rate Rshape is performed at the time t1 in response to the resource release request, the token buffer revives gradually at a ratio that is in accordance with a difference between the restricted rate Rshape and the token rate Rt (>Rshape).

Figure 13:
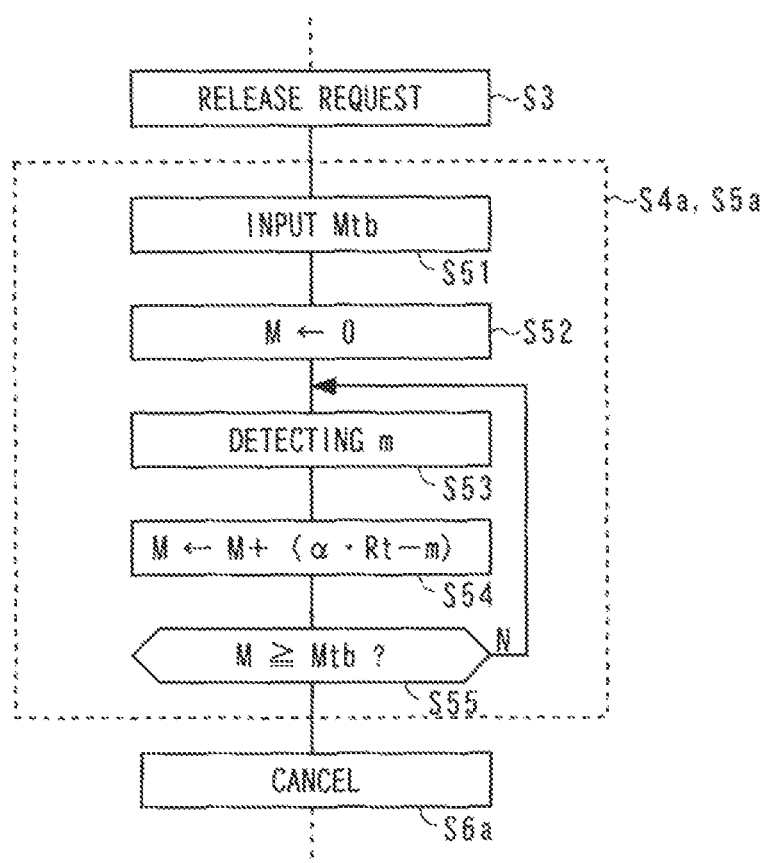
FIG. 13 is a flowchart of a fourth embodiment that is a modification of the third embodiment.

Such control according to a fourth embodiment can also be realized by changing the process of the step S4a and S5a as shown in the flowchart of FIG. 13.

That is, when, the throughput restriction of suppressing the throughput to the rate Rshape lower than the token rate Rt in response to the resource release request is started in the step S3 (time t1), the token buffer size Mtb is read in step S51. In step S52, a total token amount M is reset. In step S53, an actual transfer amount m to the network side is measured at each unit time $\Delta T$.

In step S54, with $\alpha$ as a factor for converting the token rate Rt to the token amount (for example, $\alpha=1$), the token amount m consumed by communication at the current restricted rate R-shape is subtracted from a token amount $\alpha \cdot Rt$ generated at the current token rate Rt to compute a token amount ($\alpha \cdot Rt - m$) stored in the token buffer at each unit time $\Delta T$ and the total token amount M is renewed to a value in which the token amount ($\alpha \cdot Rt - m$) has been added. The consumed token amount m can be determined from a transfer amount measured using a cumulative packet counter, etc.

In step S55, it is judged whether or not the total token amount M has reached the token buffer size Mtb, and if Mtb has not been reached, a return to step S53 is performed. When the total token amount M reaches the token buffer size Mtb, the throughput restriction is cancelled in the step S16.

By the present embodiment, when the network side becomes congested and the lowering of throughput becomes necessary, a portion of the physical link is released by restriction of the throughput to no more than the restricted rate Rshape and meanwhile the token amount stored in the token buffer is detected accurately based on the token rate and the actual transfer amount of packets. Thus if the throughput restriction is cancelled at a timing at which the token buffer is adequately filled with tokens, an effect of preventing a wasteful overflow of tokens from the token buffer and loss of opportunity for sending/receiving is provided for the user and an effect of enabling the time of throughput restriction to be maximized within a range in which the user's benefit is not compromised is provided for the network side. Further, after cancellation of the throughput restriction, burst communication is enabled and thus accurate review of the token rate is enabled.

Although with the respective embodiments, it was described that the throughput is restricted immediately when the throughput R0 falls below the threshold value Rref, even in a case where R0 falls below the threshold value Rref, if a total communication time after start of communication or after cancellation of throughput restriction is less than a predetermined guaranteed minimum time, etc., (guaranteed minimum condition), the throughput restriction may be started upon waiting for the elapse of the guaranteed minimum time, etc. Or, the judgment of whether or not to start the throughput restriction may be skipped until the total communication time reaches the predetermined guaranteed minimum time, etc.

Further, a total transfer amount may be adopted in place of the total communication time and in a case where the total transfer amount after the start of communication or after the cancellation of throughput restriction is less than a predetermined guaranteed minimum transfer amount, the throughput restriction may be started upon waiting for the guaranteed minimum transfer amount to be reached, or the judgment of whether or not to start the throughput restriction may be skipped until the total transfer amount reaches the predetermined guaranteed minimum transfer amount.

What is claimed is:

1. A traffic control apparatus for wireless communication adopting a token bucket algorithm for wireless communication relayed by a wireless base station and controlling a throughput according to a token rate, the traffic control apparatus for wireless communication comprising:
    a congestion detector for detecting a network congestion;
    a release request unit for requesting release of at least a portion of an occupied wireless resource when the network congestion is detected;
    a release term determining unit for determining a release term of the wireless resource;
    a resource request unit for requesting acquisition of the wireless resource after elapse of the release term from the release of the wireless resource; and
    a controller for suspending connection by releasing the wireless resource in response to the release request and reconnecting by acquiring the wireless resource in response to the acquisition request.

2. The traffic control apparatus for wireless communication according to claim 1, wherein in response to the release request, the controller releases a session bandwidth occupied in a wireless section by disconnecting a physical link while maintaining a logical link.

3. The traffic control apparatus for wireless communication according to claim 2, wherein in response to the release request, the controller releases a connection capacity occupied in the wireless base station by disconnecting the logical link together with the physical link.

4. The traffic control apparatus for wireless communication according to claim 1, wherein in response to the release request, the controller releases a portion of a session bandwidth occupied in a wireless section by suppressing a throughput to a restricted rate lower than the token rate while maintaining a logical link.

5. The traffic control apparatus for wireless communication according to claim 2, wherein the release term determining unit determines the release term as a time required for a token buffer to become full at the current token rate.

6. The traffic control apparatus for wireless communication according to claim 1, further comprising a unit that notifies the release term to an upper layer of a wireless node.

7. The traffic control apparatus for wireless communication according to claim 1, wherein even if the network congestion is detected, the release request unit does not request the release of the wireless resource until a total communication time or a total transfer amount satisfies a guaranteed minimum condition.

8. The traffic control apparatus for wireless communication according to claim 2, wherein the controller transitions into a dormant state in response to the release request.

9. The traffic control apparatus for wireless communication according to claim 8, wherein, at each timing immediately before a timeout of the upper layer, the controller temporarily recovers from the dormant state to temporarily establish physical connection of the wireless layer and temporarily restart wireless communication.

10. The traffic control apparatus for wireless communication according to claim 8, wherein, at each timing immediately before a timeout of the upper layer, the controller transfers data in a receive buffer to the upper layer of the wireless node and stores the data transferred from the upper layer in a send buffer to temporarily simulate wireless communication.

11. The traffic control apparatus for wireless communication according to claim 1, wherein the congestion detector comprising:
    a throughput detector for detecting a communication throughput;
    a comparator for comparing the throughput with a threshold value at which a network side is presumed to be congested, wherein
    the congestion detector detects the network congestion when the throughput falls below a threshold value.

12. A traffic control method for wireless communication by a wireless node adopting a token bucket algorithm for wireless communication relayed by a wireless base station and controlling a throughput according to a token rate, the traffic control method for wireless communication executed by the wireless node comprising the steps of:
    detecting a network congestion;
    releasing at least a portion of an occupied wireless resource when the network congestion is detected;
    determining a release term of the wireless resource; and
    securing the released wireless resource and restarting communication after elapse of the release term from the release of the wireless resource.

13. The traffic control apparatus for wireless communication according to claim 3, wherein the release term determining unit determines the release term as a time required for a token buffer to become full at the current token rate.

14. The traffic control apparatus for wireless communication according to claim 4, wherein the release term determining unit determines the release term as a time required for a token buffer to become full at the current token rate.

* * * * *